(12) United States Patent
Yang et al.

(10) Patent No.: US 11,188,347 B2
(45) Date of Patent: Nov. 30, 2021

(54) VIRTUAL FUNCTION DRIVER LOADING METHOD AND SERVER USING GLOBAL AND LOCAL IDENTIFIERS CORRESPONDING TO LOCATIONS OF THE VIRTUAL FUNCTIONS

(71) Applicant: Huawei Technologies Co., Ltd., Shenzhen (CN)

(72) Inventors: Dongtian Yang, Shenzhen (CN); Xinyu Hu, Nanjing (CN); Yuming Xie, Nanjing (CN); Yuping Zhao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 305 days.

(21) Appl. No.: 16/010,958

(22) Filed: Jun. 18, 2018

(65) Prior Publication Data
US 2018/0307498 A1 Oct. 25, 2018

Related U.S. Application Data

(63) Continuation of application No. PCT/CN2016/109749, filed on Dec. 13, 2016.

(30) Foreign Application Priority Data

Dec. 16, 2015 (CN) .......................... 201510942846.1

(51) Int. Cl.
*G06F 9/445* (2018.01)
*G06F 9/4401* (2018.01)
(Continued)

(52) U.S. Cl.
CPC ............ *G06F 9/445* (2013.01); *G06F 9/4411* (2013.01); *G06F 9/45558* (2013.01);
(Continued)

(58) Field of Classification Search
None
See application file for complete search history.

(56) References Cited

U.S. PATENT DOCUMENTS 8,788,873 B2 * 7/2014 Galles ................. G06F 13/4022
707/648
2006/0294517 A1 12/2006 Zimmer et al.
(Continued)

FOREIGN PATENT DOCUMENTS

CN 102339230 A 2/2012
CN 102576349 A 7/2012
(Continued)

OTHER PUBLICATIONS

Levasseur, J., et al., "Standardized but Flexible I/O for Self-Virtualizing Devices," First Workshop on I/O Virtualization, Dec. 11, 2008, XP055554073, 8 pages.
(Continued)

*Primary Examiner* — Michael W Ayers
(74) *Attorney, Agent, or Firm* — Conley Rose, P.C.

(57) ABSTRACT

A driver loading method and a server, where when receiving a service request, the server determines a first global index and a first global virtual function (VF) identifier corresponding to a first function description of a designated function included in the service request, determines a virtual machine (VM) corresponding to the service request, associates the first global VF identifier with the VM, allocates a first local index on the VM to the designated function, creates a correspondence between the first local index and the first function description, and sends the correspondence to the VM. The VM loads, according to the correspondence, a driver of the designated function for a first VF corresponding to the first global VF identifier. According to the foregoing method, different drivers can be loaded for VFs that have
(Continued)

different functions and that are virtualized by a Peripheral Component Interconnect Express (PCIe) device.

20 Claims, 8 Drawing Sheets

(51) Int. Cl.
*G06F 9/455* (2018.01)
*G06F 9/50* (2006.01)

(52) U.S. Cl.
CPC ........ *G06F 9/5077* (2013.01); *G06F 9/44578* (2013.01); *G06F 2009/45562* (2013.01); *G06F 2009/45579* (2013.01); *G06F 2009/45595* (2013.01); *G06F 2213/0026* (2013.01)

(56) References Cited

U.S. PATENT DOCUMENTS

| | | | |
|---|---|---|---|
| 2009/0144731 A1* | 6/2009 | Brown | G06F 13/102 718/1 |
| 2009/0241113 A1* | 9/2009 | Seguin | G06F 9/45558 718/1 |
| 2010/0250824 A1* | 9/2010 | Belay | G06F 9/45558 711/6 |
| 2011/0055433 A1 | 3/2011 | Kishore et al. | |
| 2011/0145815 A1* | 6/2011 | Zou | G06F 9/4413 718/1 |
| 2012/0284712 A1 | 11/2012 | Nimmagadda et al. | |
| 2014/0075006 A1* | 3/2014 | Cherian | H04L 41/04 709/223 |
| 2014/0108776 A1* | 4/2014 | Miyauchi | G06F 9/441 713/2 |
| 2014/0317619 A1* | 10/2014 | Tajima | G06F 9/45558 718/1 |
| 2014/0331223 A1 | 11/2014 | Lee et al. | |
| 2015/0242227 A1* | 8/2015 | Nair | G06F 12/0802 718/1 |
| 2015/0370595 A1 | 12/2015 | Arroyo et al. | |
| 2015/0381494 A1* | 12/2015 | Cherian | H04L 45/745 370/392 |
| 2015/0381527 A1* | 12/2015 | Banzhaf | H04L 47/827 709/226 |

FOREIGN PATENT DOCUMENTS

| | | |
|---|---|---|
| CN | 104142849 A | 11/2014 |
| CN | 104657305 A | 5/2015 |

OTHER PUBLICATIONS

Intel "Intel 82599 SR-IOV Driver Companion Guide," May 1, 2010, XP55554163, 44 pages.
"13.2. Using SR—IOV," Jun. 26, 2015, 6 pages.
Foreign Communication From A Counterpart Application, European Application No. 16874818.4, Extended European Search Report dated Feb. 19, 2019, 15 pages.
Machine Translation and Abstract of Chinese Publication No. CN102339230, Feb. 1, 2012, 7 pages.
Foreign Communication From A Counterpart Application, PCT Application No. PCT/CN2016/109749, English Translation of International Search Report dated Mar. 15, 2017, 2 pages.
Foreign Communication From A Counterpart Application, PCT Application No. PCT/CN2016/109749, English Translation of Written Opinion dated Mar. 15, 2017, 6 pages.
Jmq_0000, "Linux device driver-PCI bus," CSDN Blog, Retrieved from the internet:"https://blog.csdn.net/jmq_0000/article/details/7517594", Apr. 27, 2012, 16 pages.

* cited by examiner

| Global index | VF function description | Whether a VF is allocated |
|---|---|---|
| 0 | DH calc | No |
| 1 | LB | No |
| 2 | IPsec forwarding | No |
| ... | ... | ... |
| N−1 | IPsec forwarding | No |

FIG. 4A

| Global index | VF function description | Whether a VF is allocated |
|---|---|---|
| 0 | DH calc | No |
| 1 | LB | No |
| 2 | IPsec forwarding | Yes |
| ... | ... | ... |
| N−1 | IPsec forwarding | No |

FIG. 4B

| Global index | Global VF identifier |
|---|---|
| 0 | 06:10.0 |
| 1 | 06:10.1 |
| 2 | 06:10.2 |
| ... | ... |
| N−1 | 06:10.(N−1) |

FIG. 5

| Local index | VF function description |
|---|---|
| 0 | DH calc |
| 1 | IPsec forwarding |

FIG. 6

| Local index | Local VF identifier |
|---|---|
| 0 | 01:00.0 |
| 1 | 01:00.1 |

FIG. 7

| Local VF identifier | VF function description |
|---|---|
| 01:00.0 | DH calc |
| 01:00.1 | IPsec forwarding |

VIRTUAL FUNCTION DRIVER LOADING METHOD AND SERVER USING GLOBAL AND LOCAL IDENTIFIERS CORRESPONDING TO LOCATIONS OF THE VIRTUAL FUNCTIONS

CROSS-REFERENCE TO RELATED APPLICATIONS

This application is a continuation of International Patent Application No. PCT/CN2016/109749 filed on Dec. 13, 2016, which claims priority to Chinese Patent Application No. 201510942846.1, filed on Dec. 16, 2015. The disclosures of the aforementioned applications are hereby incorporated by reference in their entireties.

TECHNICAL FIELD

The present disclosure relates to network communications technologies, and in particular, to a driver loading method and a server.

BACKGROUND

With rapid development of a network functions virtualization (NFV) technology, NFV hardware acceleration becomes an important research direction.

The NFV hardware acceleration means that some virtual network functions are implemented by dedicated hardware, but not by software running on a general-purpose computer, to improve performance of the virtual network functions.

Currently, a single-root input/output (I/O) virtualization (SR-IOV) technology is used to implement the NFV hardware acceleration. The SR-IOV technology is a hardware-based virtualization solution. The SR-IOV technology allows to efficiently share a Peripheral Component Interconnect Express (PCIe) device between virtual machines (VMs). A maximum of 64000 virtual functions (VFs) can be virtualized by a PCIe device that has an SR-IOV capability and a physical function (PF). The VF refers to a component capable of executing a network function. Before each VF executes a network function, a driver corresponding to the network function needs to be installed. The PCIe device and the VF execute a same network function.

Figure 1:
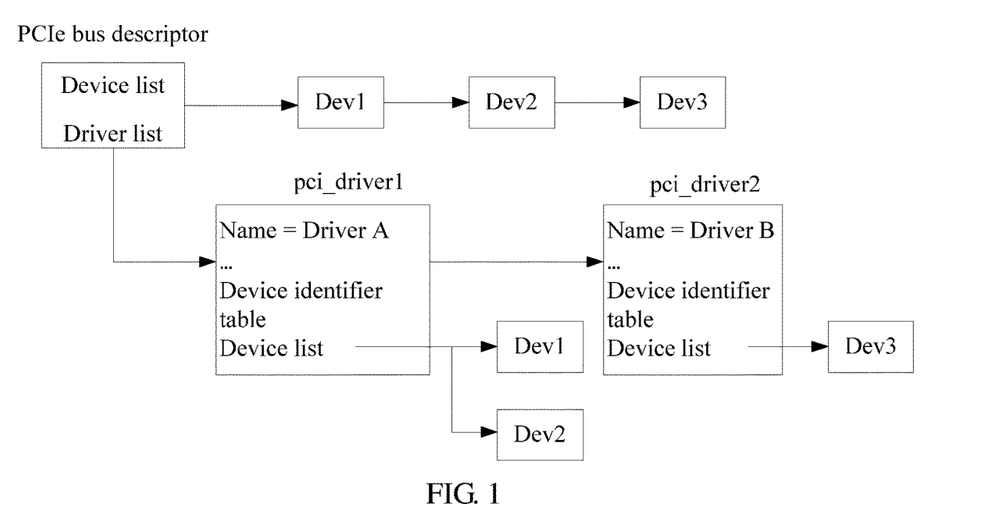
FIG. 1 is a schematic diagram of a process of loading a driver for a PCIe device.

In other approaches, a method for loading a driver for a PCIe device is provided. A server scans each device on a PCIe bus, creates, for each scanned PCIe device, a data structure describing the PCIe device, marks the data structure as dev, and adds an order of the dev to a device list corresponding to a PCIe bus descriptor. As shown in FIG. 1, it is assumed that the server scans three PCIe devices, and data structures of the three PCIe devices are dev1, dev2, and dev3.

When obtaining (for example, reading from a compact disc or downloading from a vendor website) a new PCIe driver, the server creates, for the PCIe driver, a data structure describing the PCIe driver, and marks the data structure as pci_driver. A device identifier table (also referred to as id_table) of the pci_driver includes device identifiers (also referred to as IDs) of all PCIe devices that can be driven by the PCIe driver. The ID of the PCIe device includes a vendor identifier (also referred to as vendor ID) and a device identifier (also referred to as device ID). A device ID is used to identify one type of PCIe device. The id_table is generated according to a preconfiguration provided by the vendor. The server adds the pci_driver to a driver list corresponding to the PCIe bus descriptor. In FIG. 1, the server obtains a total of two PCIe drivers. Finally, the IDs in the id_table of the pci_driver are sequentially used to perform matching with an ID of each device in the device list. When an ID in the id_table of the pci_driver is the same as an ID of a PCIe device in the device list, the PCIe device is associated with the PCIe driver. That is, the PCIe device is written to a device list of the PCIe driver. All devices in the device list of the PCIe driver can load the PCIe driver. For example, in FIG. 1, both the dev1 and the dev2 may use a driver A, and the dev3 can use a driver B. In the foregoing manner, a device ID of a PCIe device is used to determine a PCIe driver that can be loaded by the PCIe device. However, in an SR-IOV scenario, multiple VFs virtualized by one physical PCIe device have a same device ID. Therefore, different PCIe drivers cannot be loaded for different VFs virtualized by the same physical PCIe device.

SUMMARY

The present disclosure provides a driver loading method and a server such that different PCIe drivers can be loaded for different VFs virtualized by a same physical PCIe device.

A first aspect of the present disclosure provides a driver loading method. The method is implemented by a server, and the method includes receiving a service request, where the service request includes a first function description corresponding to a designated function, determining, according to the service request and a first mapping table, a first global index corresponding to the first function description, where each entry of the first mapping table includes a correspondence between a global index and a function description of a VF, the VF is a function provided during virtualization of a PCIe device, and the global index is an identifier of the valid VF on the PCIe device, determining, according to the first global index and a second mapping table, a first global VF identifier corresponding to the first function description, where each entry of the second mapping table includes a correspondence between a global index and a global VF identifier, and the first global VF identifier is used to identify a location of a first VF on the PCIe device, determining a VM corresponding to the service request, allocating a first local index on the VM to the designated function, creating a first correspondence between the first local index and the first function description, and sending the first correspondence to the VM, where the first correspondence is used by the VM to load a driver of the designated function for the first VF according to the first correspondence.

Based on the first aspect, in a first implementation of the first aspect, after determining a VM corresponding to the service request, the method further includes associating the first global VF identifier with the VM such that the VM, upon startup, can detect a VF corresponding to the first global VF identifier, and use the VF.

Based on the first implementation of the first aspect, in a second implementation of the first aspect, each entry of the first mapping table further includes a status of the VF, used to identify whether the VF has already been allocated, and the method further includes storing a correspondence between the first global index and the VM, and updating the first mapping table according to the correspondence between the first global index and the VM, and marking a VF corresponding to the first global index as allocated after the VM is successfully started.

Based on the first aspect, or the first implementation or the second implementation of the first aspect, in a third implementation of the first aspect, the method further includes obtaining the first mapping table by parsing a configuration file of the PCIe device, or receiving the first mapping table generated by a controller and sent by the controller, and obtaining a global VF identifier of each VF on the PCIe device, and generating the second mapping table according to the global VF identifiers of all the VFs and the first mapping table.

A second aspect of the present disclosure provides another driver loading method. The method is implemented by a server, and the method includes receiving a first correspondence between a first local index and a first function description of a designated function, where the first local index is an identifier of a first VF that is allocated to a VM, and the first local index is valid only on the VM, determining a first local VF identifier corresponding to the first local index, where the first local VF identifier is used to identify a location of the first VF on the VM, creating a second correspondence between the first function description and the first local VF identifier according to the first correspondence and the first local VF identifier, and loading a driver of the designated function for the first VF according to the second correspondence.

Based on the second aspect, in a first implementation of the second aspect, determining a first local VF identifier corresponding to the first local index includes searching a local index-local VF identifier mapping table to determine the first local VF identifier corresponding to the first local index, where each entry of the local index-local VF identifier mapping table includes a correspondence between a local index and a local VF identifier that are of a VF used by the VM.

Based on the first implementation of the second aspect, in a second implementation of the second aspect, the method further includes determining a global VF identifier associated with the VM, obtaining, according to the global VF identifier, a local index and a local VF identifier that are allocated to each VF of the VM on a PCIe device, and creating the local index-local VF identifier mapping table according to the local index and the local VF identifier that are of each VF.

Based on the second aspect, or the first implementation or the second implementation of the second aspect, in a third implementation of the second aspect, loading a driver of the designated function for the first VF according to the second correspondence includes running a driver loading command, where the driver loading command includes the first function description and the first local VF identifier, determining the driver of the designated function according to the first function description when it is determined, according to the first local VF identifier, that the VM has used the first VF, and loading the driver for the first VF.

A third aspect of the present disclosure provides a server. The server includes a receiving unit configured to receive a service request, where the service request includes a first function description corresponding to a designated function, a determining unit configured to determine, according to the service request and a first mapping table, a first global index corresponding to the first function description, where each entry of the first mapping table includes a correspondence between a global index and a function description of a VF, the VF is a function provided during virtualization of a PCIe device, and the global index is an identifier of the valid VF on the PCIe device, determine, according to the first global index and a second mapping table, a first global VF identifier corresponding to the first function description, where each entry of the second mapping table includes a correspondence between a global index and a global VF identifier, and the first global VF identifier is used to identify a location of a first VF on the PCIe device, and determine a VM corresponding to the service request, an allocation unit configured to allocate a first local index on the VM to the designated function, and create a first correspondence between the first local index and the first function description, and a sending unit configured to send the first correspondence to the VM, where the first correspondence is used by the VM to load a driver of the designated function for the first VF according to the first correspondence.

Based on the third aspect, in a first implementation of the third aspect, the server further includes an association unit configured to associate the first global VF identifier with the VM such that the VM, upon startup, can detect a VF corresponding to the first global VF identifier, and use the VF.

Based on the first implementation of the third aspect, in a second implementation of the third aspect, each entry of the first mapping table further includes a status of the VF, used to identify whether the VF has already been allocated, and the server further includes a storage unit configured to store a correspondence between the first global index and the VM, and an updating unit configured to after the VM is successfully started, update the first mapping table according to the correspondence between the first global index and the VM, and mark a VF corresponding to the first global index as allocated.

Based on the third aspect, or the first implementation or the second implementation of the third aspect, in a third implementation of the third aspect, the server further includes an obtaining unit configured to obtain the first mapping table by parsing a configuration file of the PCIe device, or receive the first mapping table generated by a controller and sent by the controller, and a generation unit configured to obtain a global VF identifier of each VF on the PCIe device, and generate the second mapping table according to the global VF identifiers of all the VFs and the first mapping table.

Based on any one of the third aspect or the implementations of the third aspect, the server further includes a hypervisor, and any unit in the foregoing implementations belongs to the hypervisor. The server further includes a PCIe slot configured to connect to the PCIe device.

A fourth aspect of the present disclosure provides a server. The server includes a receiving unit configured to receive a first correspondence between a first local index and a first function description of a designated function, where the first local index is an identifier of a first VF that is allocated to a VM, and the first local index is valid only on the VM, a determining unit configured to determine a first local VF identifier corresponding to the first local index, where the first local VF identifier is used to identify a location of the first VF on the VM, a creation unit configured to create a second correspondence between the first function description and the first local VF identifier according to the first correspondence and the first local VF identifier, and a loading unit configured to load a driver of the designated function for the first VF according to the second correspondence.

Based on the fourth aspect, in a first implementation of the fourth aspect, the determining unit is configured to search a local index-local VF identifier mapping table to determine the first local VF identifier corresponding to the first local index, where each entry of the local index-local VF identifier mapping table includes a correspondence between a local index and a local VF identifier that are of a VF used by the VM.

Based on the first implementation of the fourth aspect, in a second implementation of the fourth aspect, the creation unit is further configured to determine a global VF identifier associated with the VM, obtain, according to the global VF identifier, a local index and a local VF identifier that are allocated to each VF of the VM on a PCIe device, and create the local index-local VF identifier mapping table according to the local index and the local VF identifier that are of each VF.

Based on the fourth aspect, or the first implementation or the second implementation of the fourth aspect, in a third implementation of the fourth aspect, the loading unit is configured to run a driver loading command, where the driver loading command includes the first function description and the first local VF identifier, determine the driver of the designated function according to the first function description when it is determined, according to the first local VF identifier, that the VM has used the first VF, and load the driver for the first VF.

Based on any one of the fourth aspect or the implementations of the fourth aspect, the server further includes a VM, and any unit in the foregoing implementations belongs to the VM. The server further includes a PCIe slot configured to connect to the PCIe device.

A fifth aspect of the present disclosure provides a non-volatile medium. The non-volatile medium includes one or more segments of code, and when the one or more segments of code are executed by a processor, the driver loading method described in the first aspect can be implemented.

A sixth aspect of the present disclosure provides a non-volatile medium. The non-volatile medium includes one or more segments of code, and when the one or more segments of code are executed by a processor, the driver loading method described in the second aspect can be implemented.

In the present disclosure, a global index and a global VF identifier are pre-created for each VF of a PCIe device inserted into a server. When receiving a service request that includes a first function description corresponding to a designated function, the server determines a first global index corresponding to the first function description, and a first global VF identifier corresponding to the first function description, where the first global VF identifier is used to identify a location of a first VF on the PCIe device, determines a VM corresponding to the service request, associates the first global VF identifier with the VM, allocates a first local index on the VM to the designated function, creates a correspondence between the first local index and the first function description, and sends the correspondence to the VM. The VM determines, according to the correspondence, a first local VF identifier corresponding to the first local index, creates a second correspondence between the first function description and the first local VF identifier, and loads a driver of the designated function for the first VF according to the second correspondence. According to the present disclosure, different drivers can be loaded for VFs that have different functions and that are virtualized by the PCIe device. In addition, the first function description, in the service request, of the designated function may be set as required by a user to adapt to changing function and performance requirements of the user, thereby improving flexibility and scalability of service deployment.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following describes the present disclosure in detail with reference to the accompanying drawings.

Figure 2:
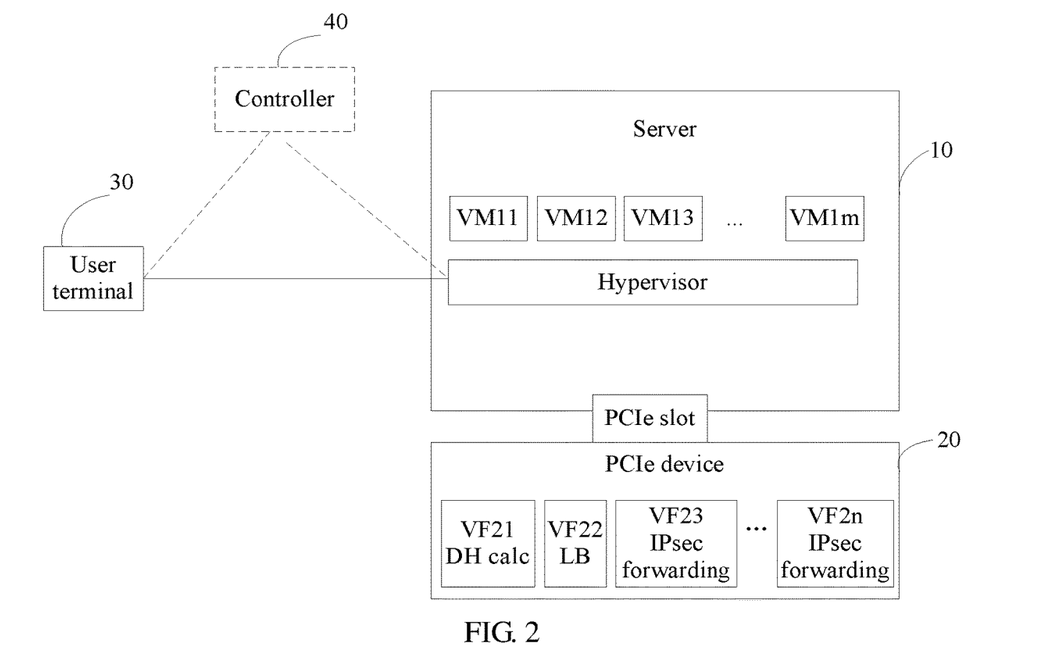
FIG. 2 is a schematic diagram of a system architecture according to an embodiment of the present disclosure.

FIG. 2 is a schematic diagram of a system architecture according to an embodiment of the present disclosure. The system includes at least a server 10 and at least one PCIe device 20. Both the server 10 and the PCIe device 20 have an SR-IOV capability. The server 10 includes at least one PCIe slot configured to connect to the PCIe device 20. That is, the PCIe device 20 is connected to the server 10 using the PCIe slot. The server 10 further includes a hypervisor. The hypervisor may create multiple VM on the server 10, marked as VM11 to VM1m. The PCIe device may generate multiple VFs using a virtualization technology, marked as VF21 to VF2n. A function of a VF may be the same as or different from a function of another VF. For example, in FIG. 2, a function of VF21 is key calculation (DH calc), a function of VF22 is load balancing (LB), and functions of VF23 and VF2n are Internet Protocol (IP) security (IPsec) forwarding. A VM may use one or more VFs to serve a user.

The server 10 may receive various service requests sent by a user terminal 30. The user terminal 30 may be a general-purpose computer, or may be a network management system. The user terminal 30 may directly send the service request to the server 10. The system may further include a controller 40. In this case, the user terminal 30 may send the service request to the server 10 using the controller 40. The server 10 further includes an interface (not shown in the figure), and the interface is used for communication with the user terminal 30 and the controller 40.

When the system runs, different drivers may be loaded for VFs that have different functions and that are virtualized by the PCIe device 20.

Figure 3:
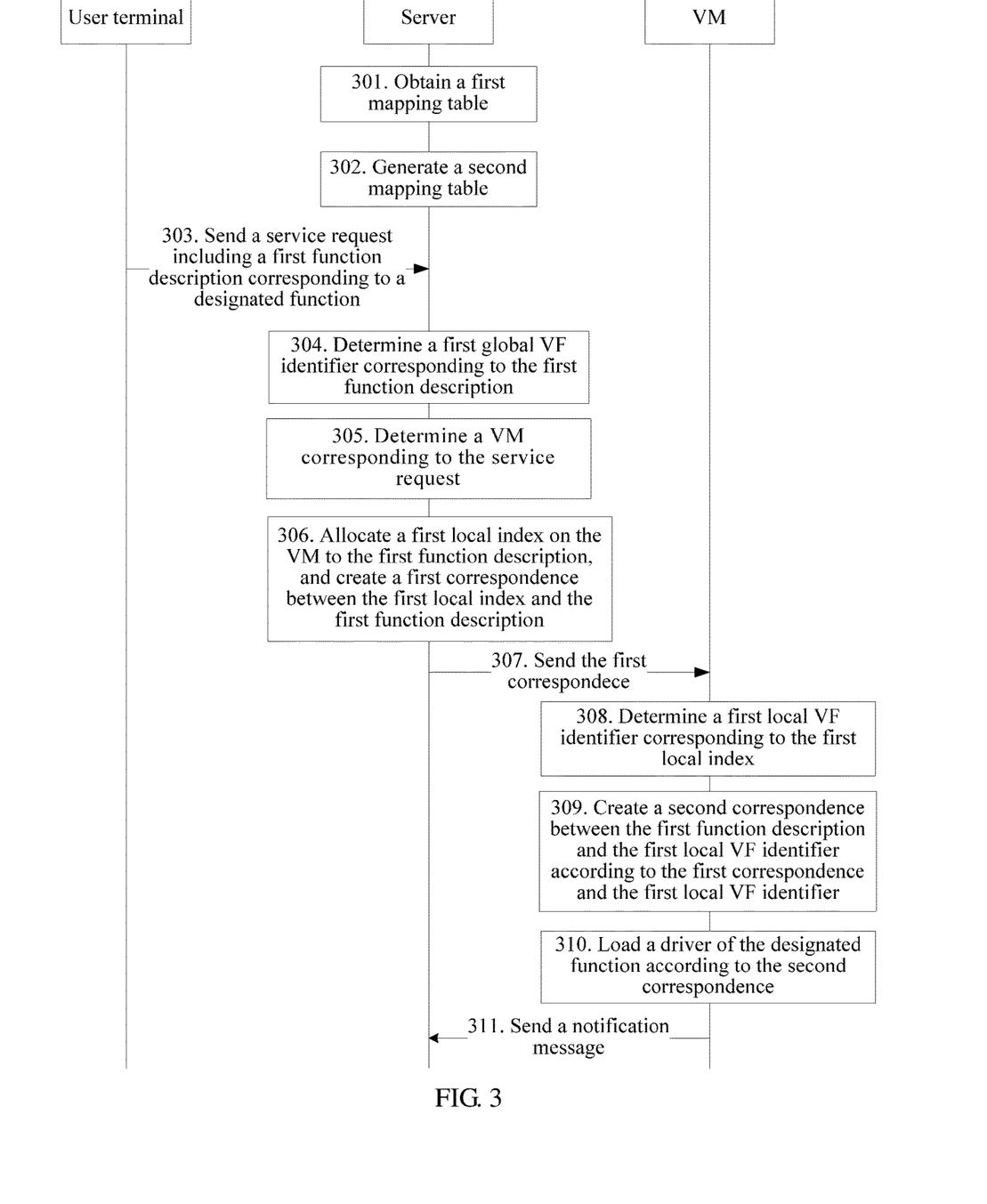
FIG. 3 is a schematic flowchart of a driver loading method according to an embodiment of the present disclosure.

As shown in FIG. 3, FIG. 3 is a schematic flowchart of a driver loading method according to an embodiment of the present disclosure. The method is implemented by the server 10 in FIG. 2.

In step 301, the server obtains a first mapping table of the PCIe device that is connected to the PCIe slot of the server, where each entry of the first mapping table includes a correspondence between a global index and a function description of a VF.

Alternatively, the server may obtain a global index-VF function description mapping table (the first mapping table) by parsing a configuration file (where the configuration file may be provided by a vendor) of the PCIe device, or may receive, from the controller 40, the first mapping table generated by the controller 40.

Figure 4A:
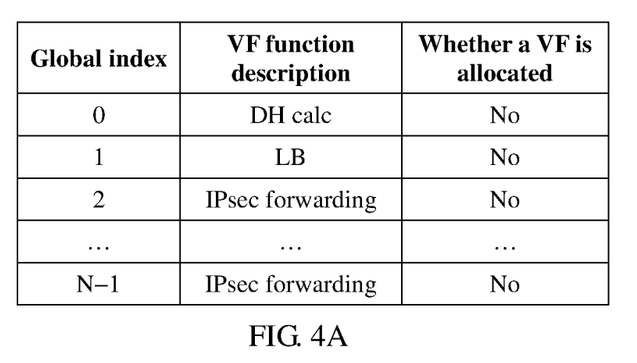
FIG. 4A is a schematic structural diagram of a first mapping table generated by a server.

In the first mapping table, a function description of a VF includes a function capable of being provided by the VF. The global index is an identifier of the valid VF on the PCIe device, and the identifier of the VF may include a number of the VF. All numbers in this embodiment of the present disclosure may start from zero. The global index of each entry is uniquely corresponding to a VF in the entry on the PCIe device. The first mapping table may further include a status of the VF, and the status of the VF includes information indicating whether the VF has already been allocated to a VM. As shown in FIG. 4A, FIG. 4A is a schematic structural diagram of the first mapping table of the PCIe device 20 in FIG. 2. It can be learned from FIG. 4A that, the PCIe device supports N VFs such as DH calc, LB, and IPsec forwarding. Each VF corresponds to a different global index (even though two VFs provide a same function, the VFs correspond to different global indexes). In addition, in an initial state, no VF is allocated to a VM for use.

In step 302, the server obtains a global VF identifier of each VF on the PCIe device, and generates a second mapping table according to the global VF identifiers of all the VFs and the first mapping table, where each entry of the second mapping table includes a correspondence between a global index and a global VF identifier.

The global index and the global VF identifier in the entry of the second mapping table correspond to a same VF.

After the PCIe device is connected to the server using the PCIe slot, the server scans the PCIe device to obtain the global VF identifier of each VF on the PCIe device in order to obtain a global index-global VF identifier mapping table (the second mapping table). A quantity of VFs on the PCIe device is the same as that of global indexes in the first mapping table. The VF may be preset on the PCIe device by a vendor, or may be automatically generated by the PCIe device according to an obtained configuration file.

Each global VF identifier is used to uniquely identify a location of a VF on the PCIe device. The global VF identifier may include a bus identifier, a device identifier, and a function identifier, which are referred to as BDF for short. In an embodiment, for ease of implementation, the bus identifier is a number allocated by the server to a bus that is connected to the PCIe device, the device identifier is a number allocated by the server to the PCIe device, and the function identifier is a number of the VF on the PCIe device. Assuming that the bus identifier of the PCIe bus corresponding to the PCIe device is 06, the device identifier is 10, and the function identifier is a number of a scanned VF, a structure of the second mapping table may be shown in FIG. 5.

The server performs steps 301 and 302 only when the PCIe device 20 is inserted into the server. Therefore, in some application scenarios of the present disclosure, steps 301 and 302 are not necessarily performed.

In step 303, the server receives a service request, where the service request includes a first function description corresponding to a designated function.

The service request may be configured using a command line, may be sent by a user terminal, or may be obtained in another manner known to a person of ordinary skill in the art. An example in which the user terminal sends the service request is used in FIG. 3. In a scenario, the service request is a function requirement proposed by a user. In another scenario, the service request may be a VM creation requirement. In addition to the first function description, the service request further includes another parameter required for VM creation, such as a VM name, required memory, and a name of an image file for VM creation. The first function description is a function that the user terminal expects to be provided by the VM. In another scenario, the service request may be a requirement for adding a function to an existing VM. In addition to the first function description, the service request further includes a VM identifier. In this case, the designated function is a function that the user terminal expects to be newly added to the VM. The designated function may be one or more. Correspondingly, the first function description may be one or more. In addition, the service request may further include a performance description of the designated function, and the performance description is a performance requirement of the designated function.

In step 304, the server determines, according to the service request and the first mapping table, a first global index corresponding to the first function description, and determines, according to the first global index and the second mapping table, a first global VF identifier corresponding to the first function description. The first global VF identifier is used to identify a location of a first VF on the PCIe device.

Figure 5:
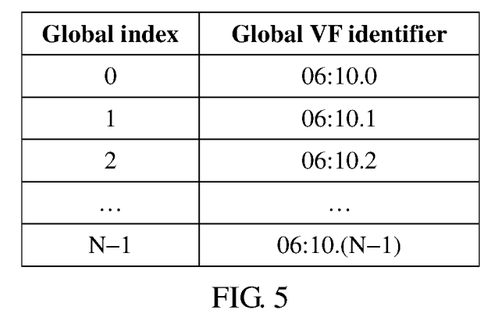
FIG. 5 is a schematic structural diagram of a second mapping table generated by a server.

For example, when the first function description is DH calc, the server searches the first mapping table shown in FIG. 4A to obtain a first global index 0, and then searches the second mapping table shown in FIG. 5 according to the first global index 0 to obtain a first global VF identifier 06:10.0 corresponding to the function DH calc.

In this step, the server sequentially searches the first mapping table according to the first function description, to determine a function description of a first VF corresponding to the first function description and that is not allocated in the first mapping table to obtain a global index of the VF function description. For example, when the first function description is IPsec forwarding, if a VF corresponding to "IPsec forwarding" with a global index being 2 is not allocated, the server determines that a global index, available to the designated function, of a VF is 2. When the VF corresponding to the "IPsec forwarding" with the global index being 2 has already been allocated, the server determines that a global index, available to the designated function, of a VF is a first global index that is not allocated and that is after the global index 2.

In step 305, the server determines a VM corresponding to the service request.

When the service request is a VM creation requirement, the server creates a VM according to a parameter included in the service request. The created VM is the VM corresponding to the service request.

When the service request is to add the designated function to an existing VM, the server determines, according to an identifier of a VM in the service request, the VM corresponding to the service request.

After determining the VM corresponding to the service request, the server may further associate the first global VF identifier with the VM. A purpose that the server associates the first global VF identifier with the VM includes upon startup, the VM can detect a first VF corresponding to the first global VF identifier, and use the first VF.

Figure 4B:
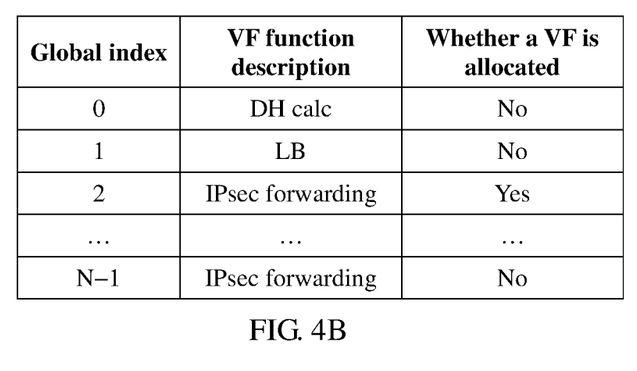
FIG. 4B is a schematic structural diagram of an updated first mapping table.

The server may further store a correspondence between the first global index and the VM. When the server determines that the VM is successfully started (before the VM loads the driver or after the VM loads the driver), the server may further update the first mapping table according to the correspondence between the first global index and the VM. That is, a VF corresponding to the first global index in the first mapping table is marked as allocated. This may prevent the server from reallocating, to another VM, a VF that has already been allocated to a VM. For example, in FIG. 4B, the server allocates a VF with a global index being 2 to a VM. After the VM is successfully started, the server marks the VF with the global index being 2 in the first mapping table as allocated. The server can proactively detect that the VM has been successfully started, or may determine, according to an acknowledgement message sent by the VM, that the VM has been successfully started.

In step 306, the server allocates a first local index on the VM to the first function description, and creates a first correspondence between the first local index and the first function description.

When there are multiple designated functions, the server needs to allocate a first local index on the VM to each designated function, and adds all the first function descriptions and corresponding first local indexes to a local index-VF mapping table (which may also be referred to as a third mapping table) corresponding to the VM. Each entry of the third mapping table includes a correspondence between a local index and a function description. The local index is an identifier of a VF allocated to the VM, and is valid only on the VM. The local index may be a number of the VF.

Figure 6:
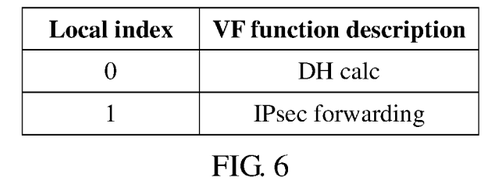
FIG. 6 is a schematic structural diagram of a third mapping table generated by a server.

When the service request is a VM creation requirement, and the function description of the designated function in the service request includes "DH calc" and "IPsec", the server first creates a VM, and searches the first mapping table according to "DH calc" and "IPsec" to obtain a global index 0 and a global index 2, and then searches the second mapping table according to the global index 0 and the global index 2 to obtain corresponding global VF identifiers 06:10.0 and 06:10.2. The server associates the global VF identifiers 06:10.0 and 06:10.2 with the VM. The server sequentially allocates local indexes on the VM to the first function descriptions (that is, the VF function descriptions in the first mapping table) "DH calc" and "IPsec forwarding", and stores the first function descriptions "DH calc" and "IPsec forwarding" and corresponding local indexes in the third mapping table. In this way, the third mapping table shown in FIG. 6 may be obtained. The VM requires only the two functions, "DH calc" and "IPsec forwarding". Therefore, in the third mapping table created by the server for the VM, a local index 0 and a local index 1 that are valid only on the VM are allocated to the function descriptions of the two functions, "DH calc" and "IPsec forwarding", respectively.

In step 307, the server sends, to the VM, a first correspondence between the first local index and the first function description.

The first correspondence between the first local index and the first function description is used by the VM to load a driver of the designated function for the VF according to the correspondence.

That the first correspondence between the first local index and the first function description is sent to the VM may include following. The first correspondence is directly sent to the VM, or the correspondence is added to the third mapping table, and the third mapping table is sent to the VM. When the service request is a VM creation requirement, optionally, the server adds correspondences of multiple first function descriptions to the third mapping table, and sends, at a time, all the correspondences to the VM using the third mapping table. When the service request is to add a designated function requirement to an existing VM, optionally, the server directly sends the correspondence to the VM.

In step 308, after receiving the first correspondence between the first local index and the first function description, the VM determines a first local VF identifier corresponding to the first local index.

Before step 308, the method further includes that the VM determines a local VF identifier of each VF allocated to the VM, and creates a local index-local VF identifier mapping table (referred to as a fourth mapping table hereinafter), where each entry of the fourth mapping table includes a correspondence, on the VM, between a local index and a local VF identifier, and each entry corresponds to a VF.

Figure 7:
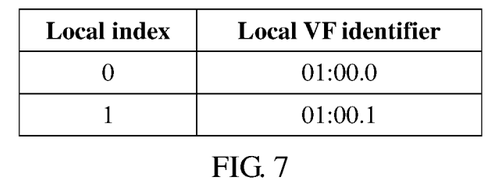
FIG. 7 is a schematic structural diagram of a fourth mapping table generated by a VM.

After the VM is started, the VM scans the PCIe device according to the first global VF identifier in step 305 (when multiple first global VF identifiers are stored, if the multiple first global VF identifiers are global VF identifiers on different PCIe devices, the VM scans each PCIe device) to obtain a local index of each VF allocated to the VM and a local VF identifier of each VF on the VM, and creates the local index-local VF identifier mapping table according to the local index and the local VF identifier that are of each VF. A local identifier is used to uniquely identify a location of a VF on the VM. The local VF identifier may include a bus identifier, a device identifier, and a function identifier. For a VF used by the VM, the bus identifier is a number allocated, by the VM to a bus connected to the PCIe device on which the VF is located. The device identifier is a number allocated to the PCIe device by the VM. The function identifier is a number allocated to the VF by the VM and valid on the PCIe device. After obtaining local VF identifiers of all VFs used by the VM, the VM allocates a local index to each local VF identifier according to a scanning order, and creates the fourth mapping table. The server and the VM use a same scanning rule. Therefore, the local index allocated by the server to a VF and that allocated by the VM to the VF are the same. Assuming that a local bus identifier, on the VM, of the PCIe device is 01, a local device identifier is 00, the VM uses two VFs that respectively support "DH calc" and "IPsec forwarding" functions, a function identifier allocated to the "DH calc" function is 0, and a function identifier allocated to the "IPsec forwarding" function is 1, the fourth mapping table may be shown in FIG. 7. The fourth mapping table includes a correspondence between the local index 0 and a local VF identifier 01:00.0 and a correspondence between the local index 1 and a local VF identifier 01:00.1.

That the VM determines, according to the first local index, the first local VF identifier corresponding to the first local index may include that the VM searches the fourth mapping table according to the first local index to obtain the first local VF identifier corresponding to the first local index.

In step 309, the VM creates a second correspondence between the first function description and the first local VF identifier according to the first correspondence between the first local index and the first function description and the first local VF identifier.

Figure 8:
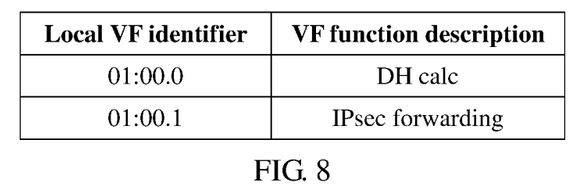
FIG. 8 is a schematic structural diagram of a fifth mapping table generated by a VM.

The VM may generate a VF-local VF identifier mapping table (referred to as a fifth mapping table hereinafter), and adds, to the fifth mapping table, the second correspondence between the first function description and the first local VF identifier. As shown in FIG. 8, FIG. 8 is a schematic structural diagram of the fifth mapping table generated by the VM. The fifth mapping table includes a correspondence between the local VF identifier 01:00.0 and the VF function description "DH calc" and a correspondence between the local VF identifier 01:00.1 and the VF function description "IPsec forwarding".

In step 310, the VM loads a driver of the designated function for the first VF according to the second correspondence.

When there are multiple first function descriptions, and correspondences of the multiple first function descriptions are written into the fifth mapping table, that the VM loads a driver of the designated function for the first VF according to the correspondence includes that the VM sequentially loads, for each VF according to the fifth mapping table, a driver of a designated function corresponding to each first function description.

When loading the driver, the VM runs a driver loading command. The driver loading command includes the first function description and the first local VF identifier. When determining, according to the first local VF identifier, that the VM has used the first VF, the VM determines the driver of the designated function according to the first function description, and loads the driver for the first VF.

Further, when the VM scans the PCIe device according to the first global VF identifier, a device list similar to that described in the background may be generated. Each VF in the device list is identified using a local VF identifier (that is, local BDF) of the VF. When loading the driver, the VM first sends, to the driver, the driver loading command including the first function description and the first local VF identifier. Then, the VM searches the device list according to the first local VF identifier. When the first local VF identifier is found in the device list, the VM obtains the driver of the designated function according to the first function description. In step 311, after the VM loads the driver of the designated function for the first VF, the VM sends a notification message to the server, where the notification message is used to notify the server that the driver corresponding to the designated function has been successfully loaded onto the VM.

Step 311 is an optional step.

Steps 301 to 307 may be implemented by a hypervisor on the server, and steps 308 to 311 may be implemented by a VM.

Figure 9:
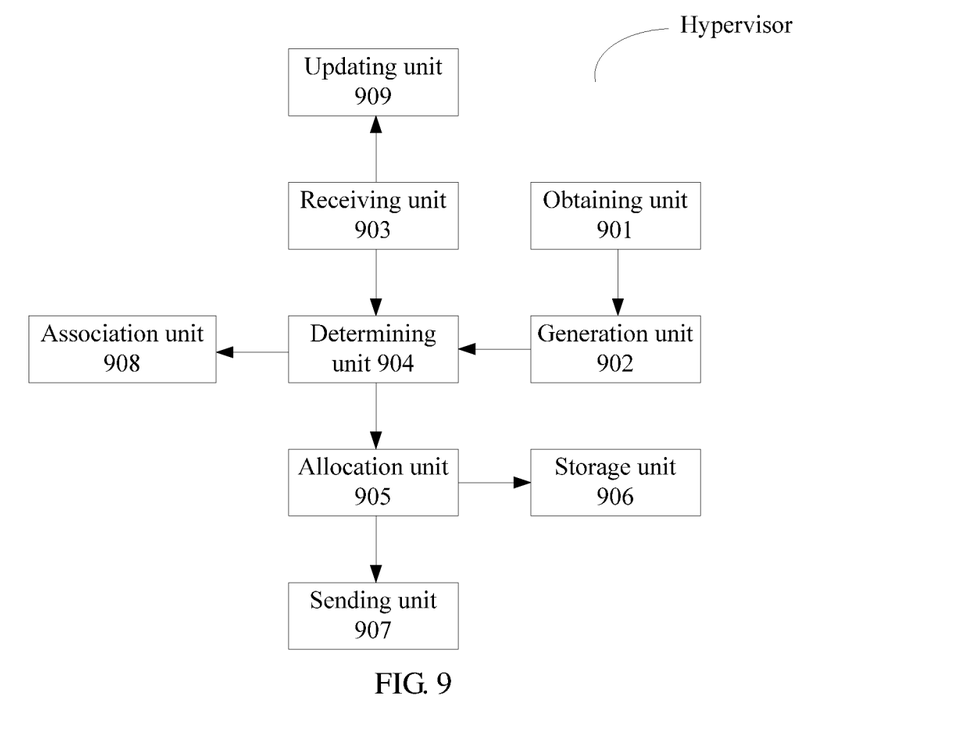
FIG. 9 is a schematic structural diagram of a hypervisor on a server.

As shown in FIG. 9, in an implementation, the hypervisor includes an obtaining unit 901 configured to perform step 301, a generation unit 902 configured to perform step 302, a receiving unit 903 configured to perform step 303, a determining unit 904 configured to perform steps 304 and 305, an allocation unit 905 configured to perform the step of allocating a first local index on the VM to the first function description in step 306, a storage unit 906 configured to store a correspondence between the first local index and the first function description, and a sending unit 907 configured to perform step 307.

For specific implementation details of the foregoing units, refer to descriptions of the steps in FIG. 3.

In an implementation, the hypervisor may further include an association unit 908 configured to associate a global VF identifier with the VM such that the VM, upon startup, can detect a VF corresponding to the global VF identifier, and use the VF.

In another implementation, the hypervisor may further include an updating unit 909 configured to update a first mapping table after the VM has been successfully started. The updating unit 909 may determine, according to an acknowledgement message received by the receiving unit 909, that the VM has been successfully started, or may determine, according to other information proactively detected by the hypervisor, that the VM has been successfully started.

Figure 10:
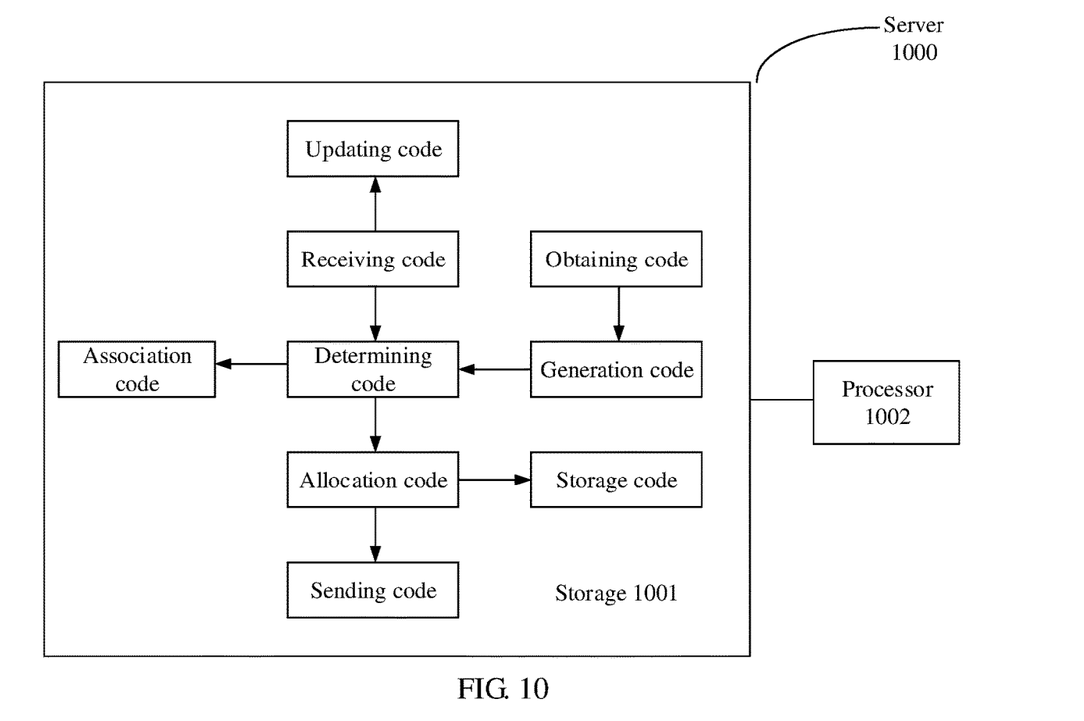
FIG. 10 is a schematic structural diagram of the server in FIG. 9.

The hypervisor is deployed on a server, and therefore, the units in FIG. 9 may also be located on the server on which the hypervisor is located. Therefore, the present disclosure further provides a server including the foregoing units. In an implementation, all the foregoing units are implemented using hardware. In another implementation, the foregoing units are separately corresponding to a segment of code. As shown in FIG. 10, the code corresponding to the foregoing units may be stored together in one non-volatile medium (e.g. storage 1001) of the server 1000, or may be individually stored in multiple non-volatile media of the server 1000. The non-volatile medium may be a storage (one storage is used as an example in the figure). The server further includes a processor 1002 configured to invoke the code corresponding to the units to implement steps 301 to 307.

Figure 11:
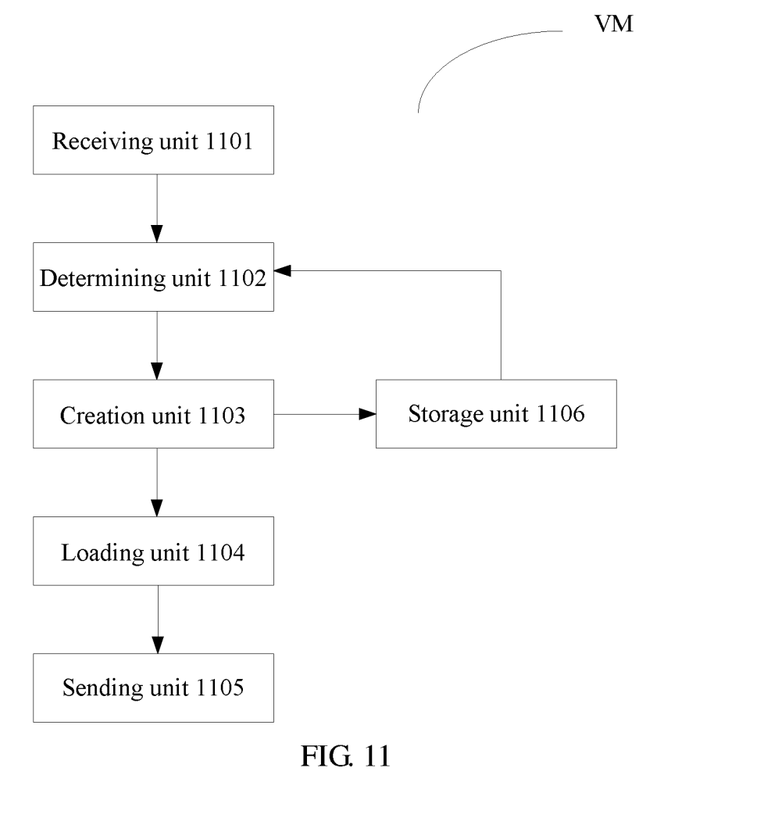
FIG. 11 is a schematic structural diagram of a VM on a server.

As shown in FIG. 11, in an implementation, the VM includes a receiving unit 1101 configured to receive a correspondence, sent by a server, between a first local index and a first function description, a determining unit 1102 configured to perform step 308, a creation unit 1103 configured to perform step 309, and create a second correspondence between the first function description and a first local VF identifier, and a loading unit 1104 configured to perform step 310.

Further, the VM may further include a sending unit 1105 configured to perform step 311.

For specific implementation details of the foregoing units, refer to descriptions of the steps in FIG. 3.

In addition, the creation unit 1103 may be further configured to create a local index-local VF identifier mapping table. For a specific process, refer to the descriptions of FIG. 3. The VM may further include a storage unit 1106 configured to store the local index-local VF identifier mapping table, and the determining unit 1102 is further configured to search the stored local index-local VF identifier mapping table to determine a local VF identifier corresponding to the local index. Each entry of the local index-local VF identifier mapping table includes a correspondence between a local index and a local VF identifier that are of a VF used by the VM. If required, the storage unit 1106 may further store a second correspondence.

Figure 12:
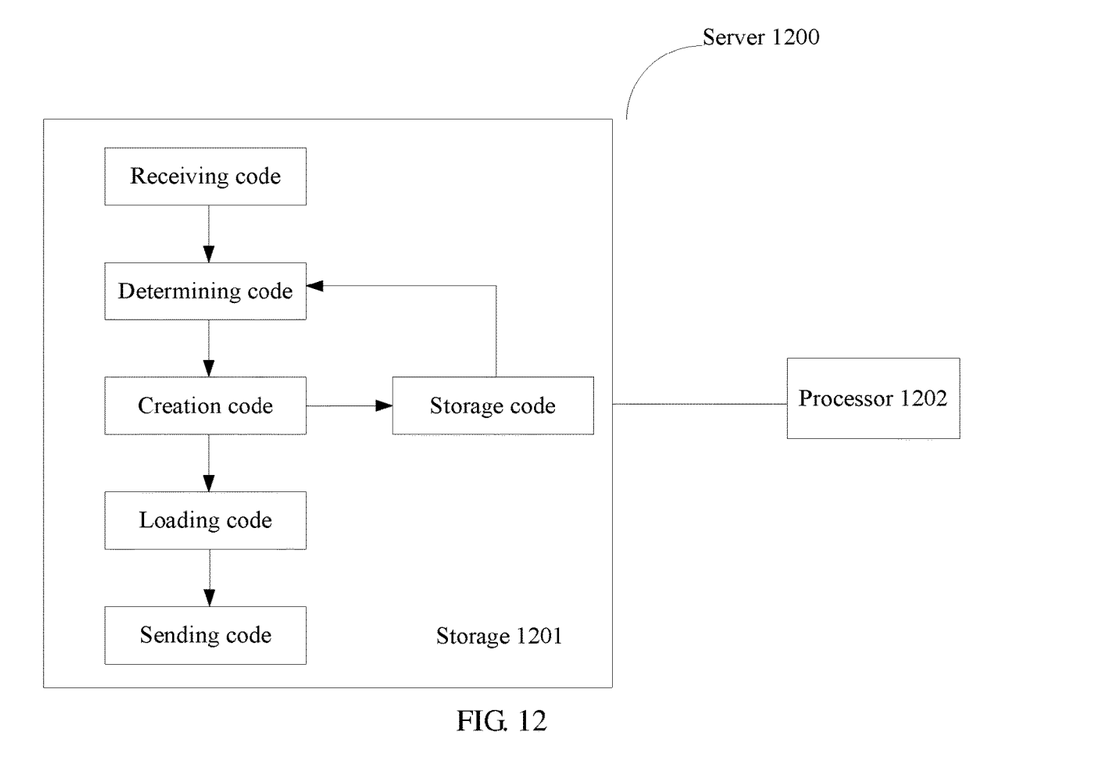
FIG. 12 is a schematic structural diagram of the server in FIG. 11.

The VM is deployed on the server, and therefore, the units in FIG. 11 may also be located on the server on which the VM is located. Therefore, the present disclosure further provides a server including the foregoing units. In an implementation, all the foregoing units are implemented using hardware. In another implementation, the foregoing units are separately corresponding to a segment of code. As shown in FIG. 12, the code corresponding to the foregoing units may be stored together in one non-volatile medium (e.g. storage 1201) of the server 1200, or may be individually stored in multiple non-volatile media of the server 1200. The non-volatile medium may be a storage (one storage is used as an example in the figure). The server 1200 further includes a processor 1202 configured to invoke the code corresponding to the units, to implement steps 308 to 311.

Both the server 1000 and the server 1200 are specific implementation forms of the server 10. Therefore, both the server 1000 and the server 1200 include at least one PCIe slot, and have an SR-IOV capability.

The foregoing implementations of the present disclosure belong to a same inventive concept, and therefore, the implementations may be mutually referenced and cited.

In this embodiment of the present disclosure, a global index and a global VF identifier are pre-created for each VF of a PCIe device inserted into a server. When receiving a service request that includes a first function description corresponding to a designated function, the server determines a first global index corresponding to the first function description, and a first global VF identifier corresponding to the first function description, where the first global VF identifier is used to identify a location of a first VF on the PCIe device, determines a VM corresponding to the service request, associates the first global VF identifier with the VM, allocates a first local index on the VM to the designated function, creates a correspondence between the first local index and the first function description, and sends the correspondence to the VM. The VM determines, according to the correspondence, a first local VF identifier corresponding to the first local index, creates a second correspondence between the first function description and the first local VF identifier, and loads a driver of the designated function for the first VF according to the second correspondence. According to the present disclosure, different drivers can be loaded for VFs that have different functions and that are virtualized by the PCIe device. In addition, the first function description, in the service request, of the designated function may be set as required by a user, to adapt to changing function and performance requirements of the user, thereby improving flexibility and scalability of service deployment.

The foregoing descriptions are merely optional implementations of the present disclosure. It should be noted that a person of ordinary skill in the art may make several improvements or polishing without departing from the principle of the present disclosure and the improvements or polishing shall fall within the protection scope of the present disclosure.

What is claimed is:

1. A drier loading method, comprising:
receiving a service request, wherein the service request comprises a first function description corresponding to a designated virtual function (VF), and wherein the service request is configured to load a drier corresponding to the designated VF;
determining, according to the service request and a first mapping table, a first global index corresponding to the first function description, wherein each entry of the first mapping table comprises a correspondence between a global index and a function description of a virtual function (VF), wherein each VF is a function provided during virtualization of a Peripheral Component Interconnect Express (PCIe) device, and wherein each global index is an identifier of a valid VF on the PCIe device;
determining, according to the first global index and a second mapping table, a first global VF identifier corresponding to the first function description, wherein each entry of the second mapping table comprises a correspondence between a global index and a global VF identifier, and wherein the first global VF identifier identifies a location of a first VF on the PCIe device;
determining a virtual machine (VM) corresponding to the service request, the VM having allocated to it a plurality of VFs;
associating the first global VF identifier with the VM;
allocating a first local index on the VM to the designated VF;
creating a first correspondence between the first local index and the first function description;
sending the first correspondence to the VM;
scanning, by the VM, the PCIe device using the first global VF identifier to obtain a local index of each VF allocated to the VM and a local VF identifier of each VF on the VM, and creating a local index-local VF identifier mapping table wherein each entry of the local index-local VF identifier mapping table comprises a correspondence between a local index and a local VF identifier of the plurality of VFs;
obtaining, by the VM, a first local VF identifier according to the first correspondence and the local index-local VF identifier mapping table, wherein the first local VF identifier identifies a location of the first VF on the VM; and
loading, by the VM, the driver of the designated function for the first VF according to the first local VF identifier.

2. The driver loading method of claim 1, wherein each entry of the first mapping table further comprises a status of the VF, wherein the status of the VF identifies whether the VF has already been allocated, and wherein the driver loading method further comprises:
storing a correspondence between the first global index and the VM; and
updating, after the VM is successfully started, the first mapping table according to the correspondence between the first global index and the VM to mark a VF corresponding to the first global index as allocated.

3. The driver loading method of claim 1, further comprising obtaining the first mapping table by parsing a configuration file of the PCIe device.

4. The driver loading method of claim 3, further comprising:
obtaining a global VF identifier of each VF on the PCIe device; and
generating the second mapping table according to the global VF identifiers of all the VFs and global indexes in the first mapping table.

5. The driver loading method of claim 1, wherein the PCIe device comprises a single root input/output virtualization (SR-IOV) capability.

6. A driver loading method, comprising:
receiving, by a virtual machine (VM), a first correspondence between a first local index and a first function description of a designated function, wherein the first local index is an identifier of a first virtual function (VF) of a plurality of VFs that are allocated to, and used by the VM, wherein the first local index is valid only on the VM;
scanning, by the VM, a PCIe device using a first global VF identifier associated with the VM to obtain a local index of each VF allocated to the VM and a local VF identifier of each VF on the VM, and creating a local index-local VF identifier mapping table wherein each entry of the local index-local VF identifier mapping table comprises a correspondence between a local index and a local VF identifier of the plurality of VFs, wherein the first global VF identifier identifies a location of the first VF on the PCIe device;
determining, by the VM, a first local VF identifier corresponding to the first local index according to it local index-local VF identifier mapping table and the first correspondence, wherein the first local VF identifier identifies a location of the first VF on the VM;
creating, by the VM, a second correspondence between the first function description and the first local VF identifier according to the first correspondence and the first local VF identifier; and loading, by the VM, a driver of the designated function for the first VF according to the second correspondence.

7. The driver loading method of claim 6, further comprising:
   determining the global VF identifier associated with the VM;
   obtaining, according to the global VF identifier, a local index and a local VF identifier that are allocated to each VF of the VM on a Peripheral Component Interconnect Express (PCIe) device; and
   creating the local index-local VF identifier mapping table according to the local index and the local VF identifier that are of each VF.

8. The driver loading method of claim 6, wherein loading the driver of the designated function for the first VF according to the second correspondence comprises:
   running a driver loading command, wherein the driver loading command comprises the first function description and the first local VF identifier;
   determining the driver of the designated function according to the first function description when it is determined, according to the first local VF identifier, that the VM has been allocated the first VF; and
   loading the driver for the first VF.

9. The driver loading method of claim 8, further comprising sending a notification message to a server, wherein the notification message notifies the server that the driver corresponding to the designated function has been successfully loaded onto the VM.

10. A server, comprising:
   a non-transitory computer readable medium that contains computer-executable instructions; and
   a computer processor coupled to the non-transitory computer readable medium and configured to execute the computer-executable instructions to cause the server to:
      receive a service request, wherein the service request comprises a first function description corresponding to a designated virtual function (VF), and wherein the service request is configured to load a driver corresponding to the designated VF;
      determine, according to the service request and a first mapping table, a first global index corresponding to the first function description, wherein each entry of the first mapping table comprises a correspondence between a global index and a function description of a virtual function (VF), wherein each VF is a function provided during virtualization of a Peripheral Component Interconnect Express (PCIe) device, and wherein each global index is an identifier of a valid VF on the PCIe device;
      determine, according to the first global index and a second mapping table, a first global VF identifier corresponding to the first function description, wherein each entry of the second mapping table comprises a correspondence between a global index and a global VF identifier, and wherein the first global VF identifier identifies a location of a first VF on the PCIe device;
      determine a virtual machine (VM) corresponding to the service request, the VM having allocated to it a plurality of VFs;
      associate the first global VF identifier with the VM;
      allocate a first local index on the VM to the designated VF;
      create a first correspondence between the first local index and the first function description;
      send the first correspondence to the VM;
      scan, by the VM, the PCIe device using the first global VF identifier to obtain a local index of each VF allocated to the VM and a local VF identifier of each VF on the VM, and creating a local index-local VF identifier mapping table wherein each entry of the local index-local VF identifier mapping table comprises a correspondence between a local index and a local VF identifier of the plurality of VFs;
      obtain, by the VM, a first local VF identifier according to the first correspondence and the local index-local VF identifier mapping table, wherein the first local VF identifier identifies a location of the first VF on the VM; and
      load, by the VM, the driver of the designated function for the first VF according to the first local VF identifier.

11. The server of claim 10, wherein each entry of the first mapping table further comprises a status of the VF, wherein the status of the VF identifies whether the VF has already been allocated, and wherein the computer processor is further configured to execute the computer-executable instructions to cause the server to:
   store a correspondence between the first global index and the VM; and
   update, after the VM is successfully started, the first mapping table according to the correspondence between the first global index and the VM to mark a VF corresponding to the first global index as allocated.

12. The server of claim 10, wherein the computer processor is further configured to execute the computer-executable instructions to cause the server to obtain the first mapping table by parsing a configuration file of the PCIe device.

13. The server of claim 12, wherein the computer processor is further configured to execute the computer-executable instructions to cause the server to:
   obtain a global VF identifier of each VF on the PCIe device; and
   generate the second mapping table according to the global VF identifiers of all the VFs and global indexes in the first mapping table.

14. The server of claim 10, wherein the server and the PCIe device comprise a single root input/output virtualization (SR-IOV) capability.

15. A server, comprising:
   a non-transitory computer readable medium that contains computer-executable instructions; and
   a computer processor coupled to the non-transitory computer readable medium and configured to execute the computer-executable instructions to cause the serer to:
      receive, using a virtual machine (VM), a first correspondence between a first local index and a first function description of a designated function, wherein the first local index is an identifier of a first virtual function (VF) of a plurality of VFs that are allocated to, and used by the VM, wherein the first local index is valid only on the VM;
      scan, using the VM, a PCIe device using a first global VF identifier associated with the VM to obtain a local index of each VF allocated to the VM and a local VF identifier of each VF on the VM, and creating a local index-local VF identifier mapping table wherein each entry of the local index-local VF identifier mapping table comprises a correspondence between a local index and a local VF identifier of the plurality of VFs, wherein the first global VF identifier identifies a location of the first VF on the PCIe device;

determine, using the VM, a first local VF identifier corresponding to the first local index according to the local index-local VF identifier mapping table and the first correspondence, wherein the first local VF identifier identifies a location of the first VF on the VM;

create, using the VM, a second correspondence between the first function description and the first local VF identifier according to the first correspondence and the first local VF identifier; and load, using the VM, a drier of the designated function for the first VF according to the second correspondence.

16. The server of claim 15, wherein the computer-executable instructions further cause the server to:

determine the global VF identifier associated with the VM;

obtain, according to the global VF identifier, a local index and a local VF identifier that are allocated to each VF of the VM on a Peripheral Component Interconnect Express (PCIe) device; and create the local index-local VF identifier mapping table according to the local index and the local VF identifier that are of each VF.

17. The server of claim 15, wherein the computer-executable instructions cause the server to load the driver of the designated function for the first VF according to the second correspondence by:

loading a driver loading command, wherein the driver loading command comprises the first function description and the first local VF identifier;

determining the driver of the designated function according to the first function description when it is determined, according to the first local VF identifier, that the VM has been allocated the first VF; and loading the driver for the first VF.

18. The server of claim 17, wherein the computer-executable instructions further cause the server to send a notification message, and wherein the notification message indicates that the driver corresponding to the designated function has been successfully loaded onto the VM.

19. The driver loading method of claim 1, further comprising receiving the first mapping table from a controller.

20. The server of claim 10, wherein the computer processor is further configured to execute the computer-executable instructions to cause the server to receive the first mapping table from a controller.

* * * * *

UNITED STATES PATENT AND TRADEMARK OFFICE
CERTIFICATE OF CORRECTION

PATENT NO.         : 11,188,347 B2
APPLICATION NO.    : 16/010958
DATED              : November 30, 2021
INVENTOR(S)        : Yang et al.

Page 1 of 1

It is certified that error appears in the above-identified patent and that said Letters Patent is hereby corrected as shown below:

In the Claims

Claim 1, Column 13, Line 40: "load a drier" should read "load a driver"

Claim 6, Column 14, Line 47: "VM, wherein" should read "VM, and wherein"

Claim 6, Column 14, Lines 61-62: "mapping table and the first correspondence, wherein" should read "mapping table, wherein"

Claim 15, Column 17, Line 13: "a drier of the" should read "a driver of the"

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*